Feb. 23, 1932.    F. J. RAYFIELD    1,846,753
VALVE
Filed Nov. 15, 1929
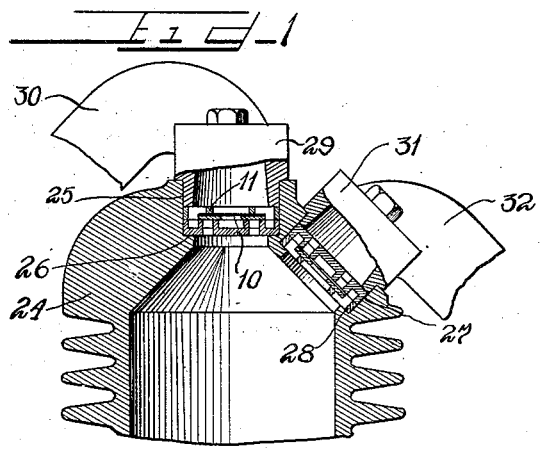
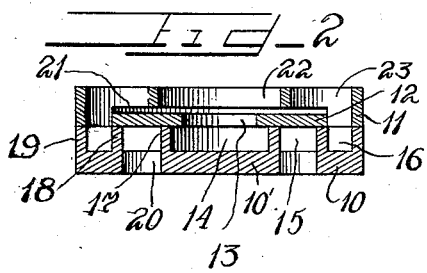
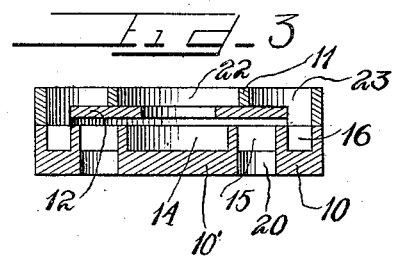
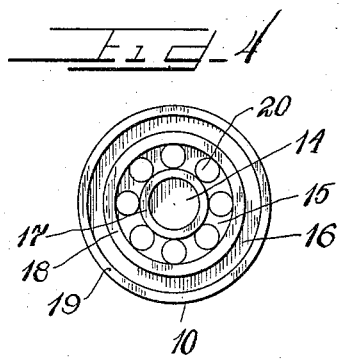
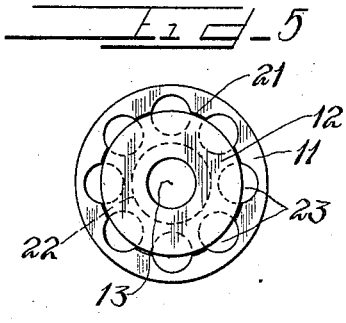
Inventor
Frederick J. Rayfield
by Charles H. Hills
Attys Patented Feb. 23, 1932

1,846,753

UNITED STATES PATENT OFFICE

FREDERICK J. RAYFIELD, OF CHICAGO, ILLINOIS, ASSIGNOR TO CHAMPION PNEUMATIC MACHINERY CO., OF CHICAGO, ILLINOIS, A CORPORATION OF ILLINOIS

VALVE

Application filed November 15, 1929. Serial No. 407,386.

My invention relates to valves, especially to disc-type check valves which are particularly adaptable for use in compressors.

One important object of the invention is to provide an improved and simplified valve structure suitable for interchangeable use in the inlet or outlet passages of fluid compressors.

Another important object is to provide a valve structure whose shape is that of a perfect cylinder so that it may be readily slipped into cylindrical inlet or outlet passageways of such devices as compressors.

A further important object is to provide a valve element in the form of a light, circular sheet metal disc and arrangement to shield such disc against violent and noisy impact.

Another important object is to so construct and arrange the supporting and enclosing framework for the valve disc that such framework will take the brunt of the fluid impact and will permit only sufficient pressure against the disc to keep it firmly on its seat or raised above the seat.

A further important object is to provide such arrangement for the flow of fluid through the valve structure that the fluid will assist in cushioning the impact of the valve disc and will prevent chattering or fluttering thereof.

The above enumerated and other features of construction and operation of my improved valve are exemplified in the structure disclosed on the drawings, in which drawings:

Figure 1 is a diametrical section of the upper end of a cylinder showing my improved valve, applied in the inlet and outlet passageways;

Figure 2 is an enlarged diametrical section of the valve structure showing the valve closed;

Figure 3 is a similar section of the valve structure showing the valve open;

Figure 4 is a plan of the valve structure seat member, and

Figure 5 is an innerside view of the valve structure cage member and the valve disc positioned therein.

My improved structure consists of three members, namely, the valve seat member 10, the cage member 11, and the valve disc 12. The valve disc is circular and of sheet metal and has the central circular passageway 13 therethrough. The seat and cage members are each of flat cylindrical form and of the same outer diameter and when applied to each other to enclose the valve disc they form a valve structure which is of cylindrical outline.

The seat member has the inner depression 14, the intermediate annular depression 15, and the outer annular depression 16, such depressions being concentric and separated by the walls 17, 18, and 19. The depressions form spaces for fluid, and extending transversely through the seat member and communicating with the intermediate space 15 are the fluid passages 20 which may be spaced in a circular row as clearly shown in Figure 4.

The edge surfaces of the walls 17 and 18 form inner and outer annular seats for the valve disc 12, as clearly shown in Figures 2, 3 and 4 and when the valve is on its seat it closes the passageways 20 against the flow of fluid.

The cage member 11 has on its inner side the depression 21 whose diameter is slightly greater than that of the valve disc and whose depth is sufficiently greater than the thickness of the valve disc to permit sufficient axial movement of the valve disc away from its seat for the proper flow of fluid through the valve structure. The cage member has also a central passageway 22 concentric with the depression 21 and of larger diameter than the aperture 13 of the valve disc. Between this central opening 22 and the edge of the member 11 are the passageways 23 which may be circular and which are spaced in a circular row around the passageway 22 as clearly shown in Figures 2, 3, and 5. When the cage member and seat member are brought together to form the cylindrical valve structure, the valve disc will be limited in its axial movement by its engagement with the seats 17 and 18 and its engagement with the bottom of depression 21, and its radial clearance will be limited by its engagement with the side walls surrounding the depression 21. The passages 23 of member 11 are opposite the intermediate and outer depressions or spaces 15 and 16, respectively, of the seat member 10, and the central passageway 22 of the member 11 is concentric with the valve disc aperture 13 and the central depression or space 14 of the seat member.

For more clearly illustrating the operation of my improved valve structure, I have shown it applied to a cylinder 24 which may be the cylinder of a fluid compressor.

As shown, the cylinder has in its upper end the cylindrical outlet passageway 25 which is slightly contracted near its lower end to form a shoulder 26. The cylinder has also a cylindrical inlet passageway 27 contracted at its inner end to form an annular shoulder 28. The diameter of the passageways 25 and 27 is such that the cylindrical valve structure will readily fit therein to seat on the respective shoulder. A suitable head 29 is secured over the outlet 25 and extends downwardly therein to hold the valve structure on the supporting shoulder 26, and a fluid conduit 30 extends from the head through which conduit the fluid discharged from the cylinder is conducted to a suitable reservoir (not shown). Likewise, a head 31 is secured to the cylinder over the inlet 27 and is extended to hold the valve structure against the supporting shoulder 28, and a fluid intake conduit 32 connects with the head. In the inlet passage 27, the valve structure will be applied with its seat member 10 on the outside, and in the outlet passage 25 the valve structure will be applied with its seat member on the inside, as shown. When the piston moves outwardly in the cylinder, suction is created and the pressure in the outlet passage 25 will force the valve disc against its concentric seats 17 and 18 to shut off the passageways 20 and thus close the valve structure to flow therethrough. The fluid drawn through the inlet 27 will lift the valve disc off its seat and against the bottom of the depression 21 in the cage member 11, and the fluid entering through the passages 20 flows partly around the outer edge of the valve disc and through the passages 23 into the cylinder and partly around the inner edge of the valve disc through its aperture 13 and through the passage 22 into the cylinder. During the instroke of the cylinder piston, the disc of the valve structure in the inlet passageway will be held against its seat to close the inlet, and the disc of the valve structure in the outlet passage will be held off of its seat to permit the flow of the compressed fluid from the cylinder. Figure 3 shows the position of the valve structure during such outflow.

It will be noted that when the piston begins an instroke, or an outstroke the fluid is suddenly forced and pressed against the outer face of the seat member 10 of the respective valve structure, but with the arrangement shown, the seat member section 10', which is surrounded by the passageways 20, will bear the brunt of the air impact and will deflect the fluid to the passages 20 from which passages the fluid flows through the valve structure partly around the outer edge of the valve disc and partly around the inner edge. Such spreading or branching of the flow around the valve disc relieves the impact engagement of the valve disc with the cage member when the disc is raised from its seat, while at the same time the fluid streams which flow around the valve disc will hold it in its seated position and will prevent fluttering and chattering and consequently wear of the disc.

When after a compression stroke the piston starts its instroke, the pressure at the compressor outlet will be suddenly applied against the outside of the valve structure, but a considerable part of the initial impact of the fluid will be taken up in the depressions 14 and 16 of the seat member so that the impact of the valve disc against its seat surfaces will be correspondingly relieved, but after the disc is once seated it will be firmly held by the pressure and prevented thereby from chattering or wearing.

I am aware that changes may be made in the structure and arrangement without departing from the principles of my invention, and I, therefore, do not purpose limiting myself otherwise than necessitated by the prior art.

I claim as follows:

A valve structure for compressors consisting of only three members, namely, a flat cylindrical seat member and a flat cylindrical cage member and an annular valve disc between said members, inner and outer walls on said seat member concentric therewith and forming parallel annular seats for said valve disc, there being fluid ports through said seat member between said walls, said cage member having a cylindrical depression in its inner side for confining the valve disc against radial displacement, said depression being of only slightly greater depth than the thickness of said valve disc whereby to limit the unseating movement of said valve disc, said cage member having fluid passageways therethrough for communicating with the seat member fluid ports when the valve disc is unseated, the inner engaging surfaces of said seat and cage members being in a common plane with the seating surfaces for said valve disc, said seat member and said cage member being of the same external diameter whereby said valve structure may be reversibly applied in the cylindrical fluid flow passageways of a compressor cylinder.

In testimony whereof I have hereunto subscribed my name at Chicago, Cook County, Illinois.

FREDERICK J. RAYFIELD.